(12) United States Patent
Singh et al.

(10) Patent No.: US 11,119,254 B2
(45) Date of Patent: Sep. 14, 2021

(54) SUBSTRATE WRINKLED COATING

(71) Applicant: Valeo North America, Inc., Troy, MI (US)

(72) Inventors: Shivi Singh, Seymour, IN (US); Gavin Warner, Seymour, IN (US); Robert Fraizer, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 425 days.

(21) Appl. No.: 15/341,648

(22) Filed: Nov. 2, 2016

(65) Prior Publication Data

US 2018/0120482 A1    May 3, 2018

(51) Int. Cl.
| | |
|---|---|
| *G02B 5/02* | (2006.01) |
| *B05D 3/06* | (2006.01) |
| *B05D 5/06* | (2006.01) |
| *B05D 7/00* | (2006.01) |
| *B05D 1/32* | (2006.01) |
| *C09D 5/28* | (2006.01) |
| *B32B 27/20* | (2006.01) |

(52) U.S. Cl.
CPC ............ *G02B 5/0221* (2013.01); *B32B 27/20* (2013.01); *C09D 5/28* (2013.01); *Y10T 428/25* (2015.01)

(58) Field of Classification Search
CPC .. B29D 11/00798; B29D 11/00; B05D 5/062; B05D 3/065; B05D 5/06; B05D 2601/10; B05D 2601/28; F21S 41/28; G02B 5/0221; G02B 5/0294; G02B 5/0268; G02B 5/0278
See application file for complete search history.

(56) References Cited

U.S. PATENT DOCUMENTS

| | | | | |
|---|---|---|---|---|
| 3,041,195 A | * | 6/1962 | Kuester | B05D 5/06 |
| | | | | 427/257 |
| 5,529,728 A | | 6/1996 | Buazza et al. | |
| 6,399,670 B1 | | 6/2002 | MacQueen et al. | |
| 2001/0033432 A1 | * | 10/2001 | Clark | F21V 5/045 |
| | | | | 359/742 |
| 2001/0038910 A1 | | 11/2001 | MacQueen et al. | |
| 2002/0132871 A1 | | 9/2002 | Colton et al. | |
| 2006/0023127 A1 | * | 2/2006 | Peeters | C03C 17/007 |
| | | | | 349/1 |
| 2016/0033692 A1 | | 2/2016 | Kusama et al. | |
| 2017/0059117 A1 | * | 3/2017 | Lee | B05D 3/007 |

FOREIGN PATENT DOCUMENTS

WO    WO-2015199796 A2 * 12/2015 ............... B05D 1/28

OTHER PUBLICATIONS

Basu et al., Mechanism of wrinkle formation in curing coatings, Progress in Organic Coatings, vol. 53, Issue 1, 2005, pp. 1-16 (Year: 2005).*
Hongbo Lin, et al., "Simultaneous Formation of a Self-Wrinkled Surface and Silver Nanoparticles on a Functional Photocuring Coating", Langmuir, vol. 31, No. 43, 2015, pp. 11800-11808 (Abstract only).
Dinesh Chandra, et al., "Self-Wrinkling of UV-Cured Polymer Films", Advanced Materials, vol. 23, Issue 30, Aug. 9, 2011, pp. 3441-3445.

* cited by examiner

*Primary Examiner* — Cheng Yuan Huang
(74) *Attorney, Agent, or Firm* — Valeo North America, Inc.

(57) ABSTRACT

A system and a method include a substrate wrinkled coating having a substrate, and a curing layer on top of the substrate. The curing layer includes a partially cured portion directly atop the substrate, and a completely cured portion having light-diffusive wrinkles on top of the partially cured portion. Properties of the light-diffusive wrinkles are controlled by one or more curing parameters, and a composition of the partially cured portion is the same as a composition of the completely cured portion.

10 Claims, 9 Drawing Sheets

Applying a curing material to a substrate
S410

Exposing radiation to the curing material by a radiation source, wherein the exposing forms a wrinkled coating to a top surface of the curing material, and properties of the wrinkled coating are controlled by one or more curing parameters, and the wrinkled coating is configured to diffuse light rays emanating through the substrate
S420

Applying a curing material to a substrate
S510

Exposing radiation to the curing material by a radiation source, wherein the exposing forms a wrinkled coating to a top surface of the curing material, and properties of the wrinkled coating are controlled by one or more curing parameters, and the wrinkled coating is configured to diffuse light rays emanating through the substrate
S520

Applying a nanoparticle coating on a surface of the wrinkled coating
S530

SUBSTRATE WRINKLED COATING

BACKGROUND

Multiple automotive lamps are located in strategic automobile positions to provide guidance to the driver of the automobile during non-daylight hours. The automotive lamps are also configured to provide identification and warning to other automobile drivers nearby to provide a safe driving experience. Automotive lamps include, but are not limited to head lamps, tail lamps, signal lamps, brake lamps, flasher lamps, back-up lamps, parking lamps, license plate lamps, fog lamps, and internal lighting.

The lens of an automotive lamp generally requires treatment, such that the light emanating from the lamp is diffuse and scattered, especially for a headlight lamp. This feature also plays an important role in the aesthetics of the tail lamp because the light functions in a more homogenous manner. In one treatment, the mold in which the lens is created has a textured surface. However, this has shortcomings in which spots are formed on the edges and on curved areas of the lens. Further, expensive molds are necessary to achieve different diffusive effects.

In a second treatment, a polycarbonate film can be textured and applied to the lens. However, one layer may not be adequate to provide the desired diffusion since these films are also limited by the molding process. Therefore, three or four layers may be necessary.

The "background" description provided herein is for the purpose of generally presenting the context of the disclosure. Work of the presently named inventors, to the extent it is described in this background section, as well as aspects of the description which may not otherwise qualify as conventional art at the time of filing, are neither expressly nor impliedly admitted as conventional art against the present disclosure.

SUMMARY

In one embodiment, a substrate wrinkled coating includes a substrate and a curing layer on top of the substrate. The curing layer includes a partially cured portion directly atop the substrate, and a completely cured portion having light-diffusive wrinkles on top of the partially cured portion. Properties of the light-diffusive wrinkles are controlled by one or more curing parameters, and a composition of the partially cured portion is the same as a composition of the completely cured portion.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Embodiments described herein provide systems of and methods for a diffuse wrinkled coating for a lamp lens. In particular, a single wrinkled coating having desired diffusion properties is described herein.

The following descriptions are meant to further clarify the present disclosure by giving specific examples and embodiments of the disclosure. These embodiments are meant to be illustrative rather than exhaustive. The full scope of the disclosure is not limited to any particular embodiment disclosed in the specification, but rather is defined by the claims.

In the interest of clarity, not all of the features of the implementations described herein are shown and described in detail. It will be appreciated that in the development of any such actual implementation, numerous implementation-specific decisions will be made in order to achieve the developer's specific goals, such as compliance with application- and business-related constraints, and that these specific goals will vary from one implementation to another and from one developer to another.

Figure 1:
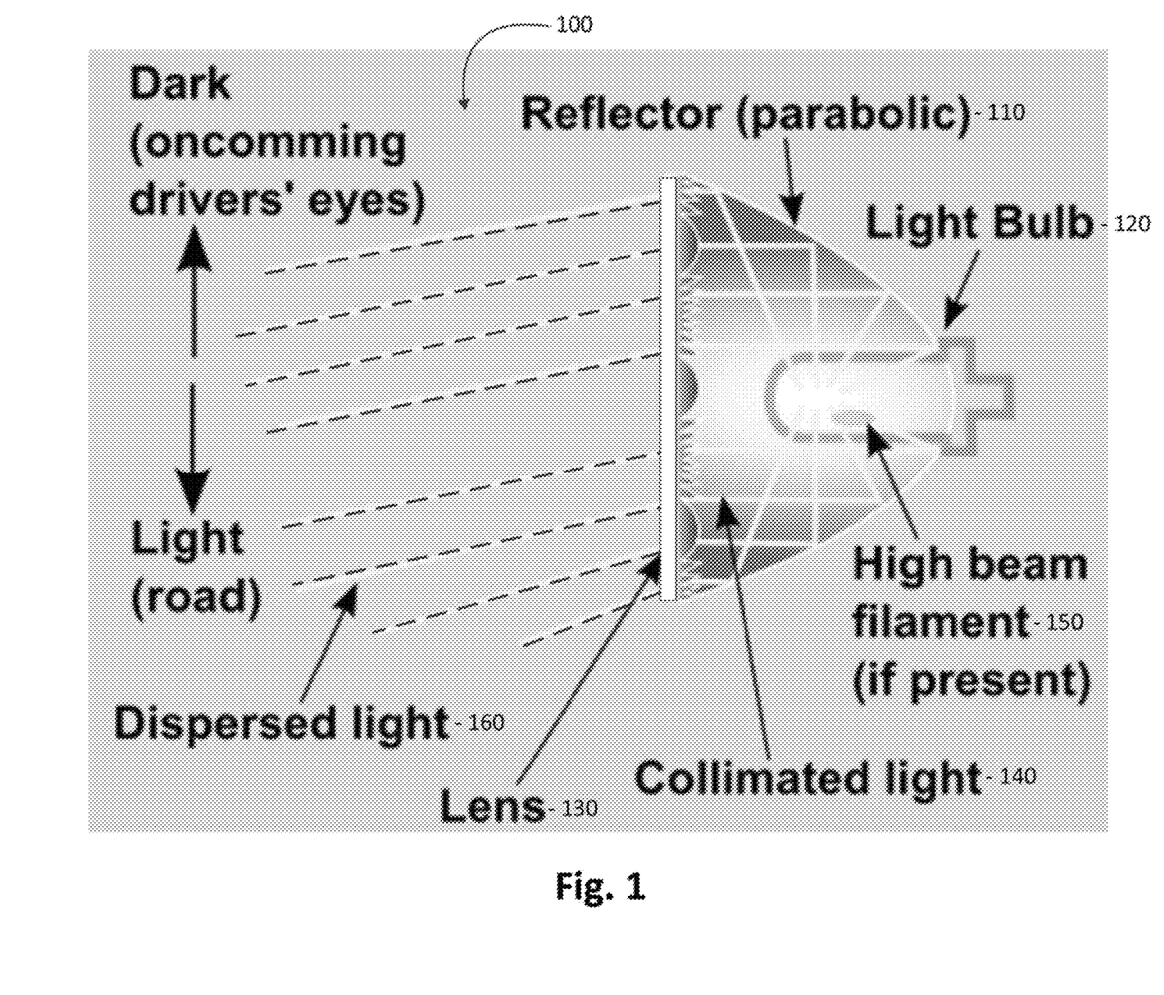
FIG. 1 is a schematic diagram of an automotive lamp according to an embodiment.

FIG. 1 is a schematic diagram of an automotive lamp 100, such as a headlight lamp. A reflector 110 is formed in the shape of a parabolic shell. Light rays from a light bulb 120 emanate in all directions. Some light rays pass directly forward through a lens 130 to the outside environment. Other light rays hit the interior surface of the reflector 110 and are reflected as collimated light 140. The geometry of the reflector 110 reflects the collimated light 140 through the lens 130 and into the outside environment.

A high beam filament 150 can be located within or apart from the light bulb 120. In most 2-filament sealed beams and bulbs, the high-beam filament 150 is at the focal point of the reflector 110, while a low-beam filament is off focus. In right-traffic countries, the low-beam filament is positioned slightly upward, forward, and leftward of the focal point.

Dispersed light 160 includes direct light rays and collimated light rays 140 that have passed through the lens 130. The automotive lamp 100 is oriented in a position on the automobile, such that most of the dispersed light 160 is directed downward onto the road surface with minimal light directed into the eyes of a driver in an oncoming automobile.

The size and geometry of automotive lamp 100 can be adjusted for various types of lamps, such as head lamps, tail lamps, signal lamps, brake lamps, flasher lamps, back-up lamps, parking lamps, license plate lamps, and fog lamps. In addition, the color of lens 130 can be varied, depending upon the type of automotive lamp 100. One function of the coating, specifically for tail lamps is aesthetics because it provides a homogenous glowing look.

Figures 2A, 2B:
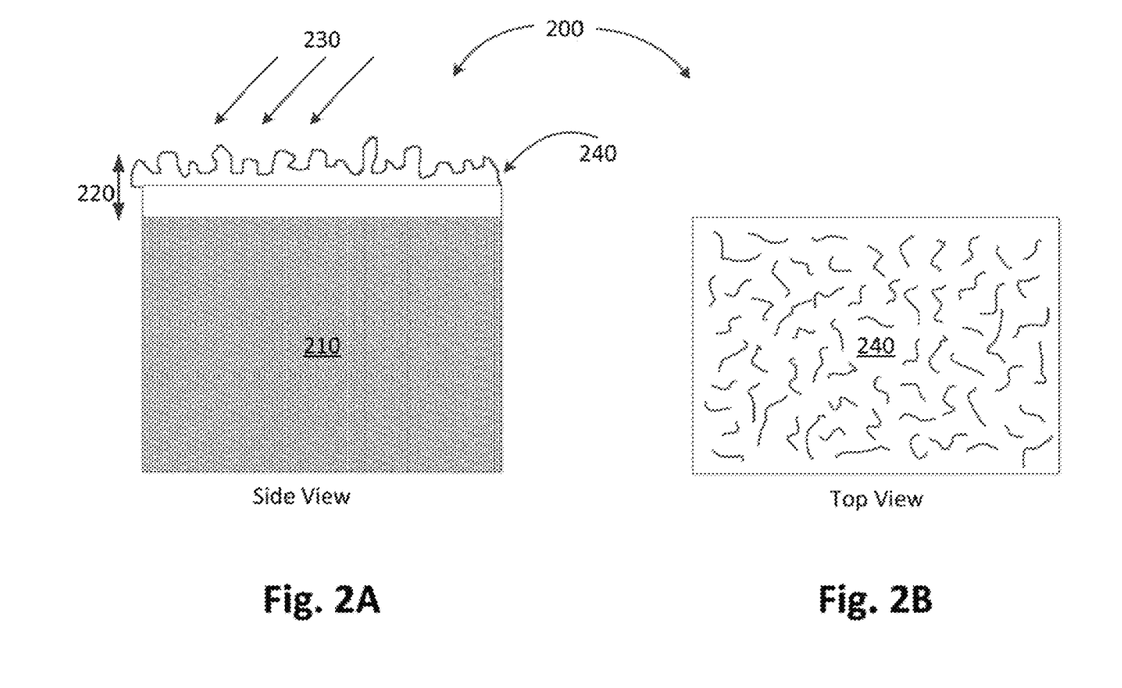
FIG. 2A illustrates a side view of a lens according to an embodiment.
FIG. 2B illustrates a top view of a wrinkled coating according to an embodiment.

Embodiments herein describe a wrinkling layer on the surface of a lamp lens to diffuse and scatter light rays as they pass through the lamp lens. FIG. 2A illustrates a side view of a lens 200. Lens 200 has a substrate 210 on which one or more coatings are formed. On the surface of the substrate 210 is a curing layer 220 including an initiator and a varnish or resin. A curing initiator can be a thermal initiator or a UV light initiator. An example of a UV light initiator is a fluorinated polymeric photo initiator. Exemplary resins include, but are not limited to acrylate cross-linkers, polyurethane, urethane, etc.

The curing initiator is exposed to radiation 230, such as ultra-violet (UV) radiation or thermal radiation until a desired curing condition is reached. The curing parameters can be varied to produce a desired wrinkled coating 240. A resin coating which is less than 29% diffusive can be used. In one embodiment, a legal governing body, such as the Automotive Manufacturers Equipment Compliance Agency (AMECA) requires less than 30% diffusivity. After completing the wrinkle process, the overall diffusivity can be over 29% since it is part of the texture and therefore, does not have requirements for diffusivity under AMECA.

Curing parameters include, but are not limited to time, temperature, thickness of the coating, a type of initiator, exposure wavelength, amount of coating applied to the substrate, and exposure power. In an embodiment, a UV short curing time at a high exposure power level results in the top surface of curing layer 220 curing faster than a bottom region. Only a small amount of the UV light is able to completely penetrate through curing layer 220 down to the substrate 210. As a result, the top surface of curing layer 220 crumples to form the wrinkled coating 240, due to stresses developed while curing. FIG. 2B illustrates a top view of the wrinkled coating 240.

An objective of embodiments described herein is to control the curing process and thereby control parameters of the wrinkled coating 240. Wrinkle parameters include, but are not limited to the wrinkle density, the wrinkle height, material composition, the amount of curing layer 220 applied to the substrate 210, thickness of the curing layer 220, a type of initiator used, an exposure time, and a type of curing, such as UV or thermal curing. The wrinkle parameters of the wrinkled coating 240 determine the optical properties of the light rays penetrating through the wrinkled coating 240 of the lens 200. In an embodiment, a dense wrinkled coating 240 having taller wrinkles will diffuse the penetrating light more than a sparse wrinkled coating 240 with shorter wrinkles.

Two curing parameters include the curing time and the curing power. Two wrinkle parameters include the wrinkle density and the wrinkle height. In an example, a higher curing power used with a shorter curing time forms a dense layer of taller wrinkles. The short curing time does not allow the radiation to completely penetrate through the curing layer 220. The higher curing power cures the top surface of the curing layer 220 quickly. As a result, the layer of dense and tall wrinkles provides a diffuse effect as dispersed light penetrates through the curing layer 220. Tall wrinkles can be achieved by a large quantity of curing layer 220 applied to the substrate 210.

In contrast, a longer curing time used with a lower curing power results in a nearly completely cured layer with little or no wrinkles on the surface of the curing layer 220. As a result, there is minimal diffusion of dispersed light penetrating through the curing layer 220.

Table 1 illustrates a relationship of the curing parameters and the wrinkle parameters for a particular varnish or resin material.

TABLE 1

| Curing parameters and wrinkle parameters for Acrylate cross-linkers |  |  |
|---|---|---|
| Curing Parameters | Wrinkle Parameters | |
| Hi P/30 sec | Dense wrinkles | Tall wrinkles |
| Med P/60 sec | Med density wrinkles | Med height wrinkles |
| Low P/90 sec | Low density wrinkles | Short wrinkles |

The wrinkle parameters can be controlled by changing certain parameters, such as the power and the curing time and the amount of curing layer 220 applied to the substrate 210. The parameters for the power and curing time are illustrated in Table 1 for different densities, which are used as a prediction. The densities and height of wrinkles can also be controlled by adjusting the thickness of the curing layer 220.

Figure 6:
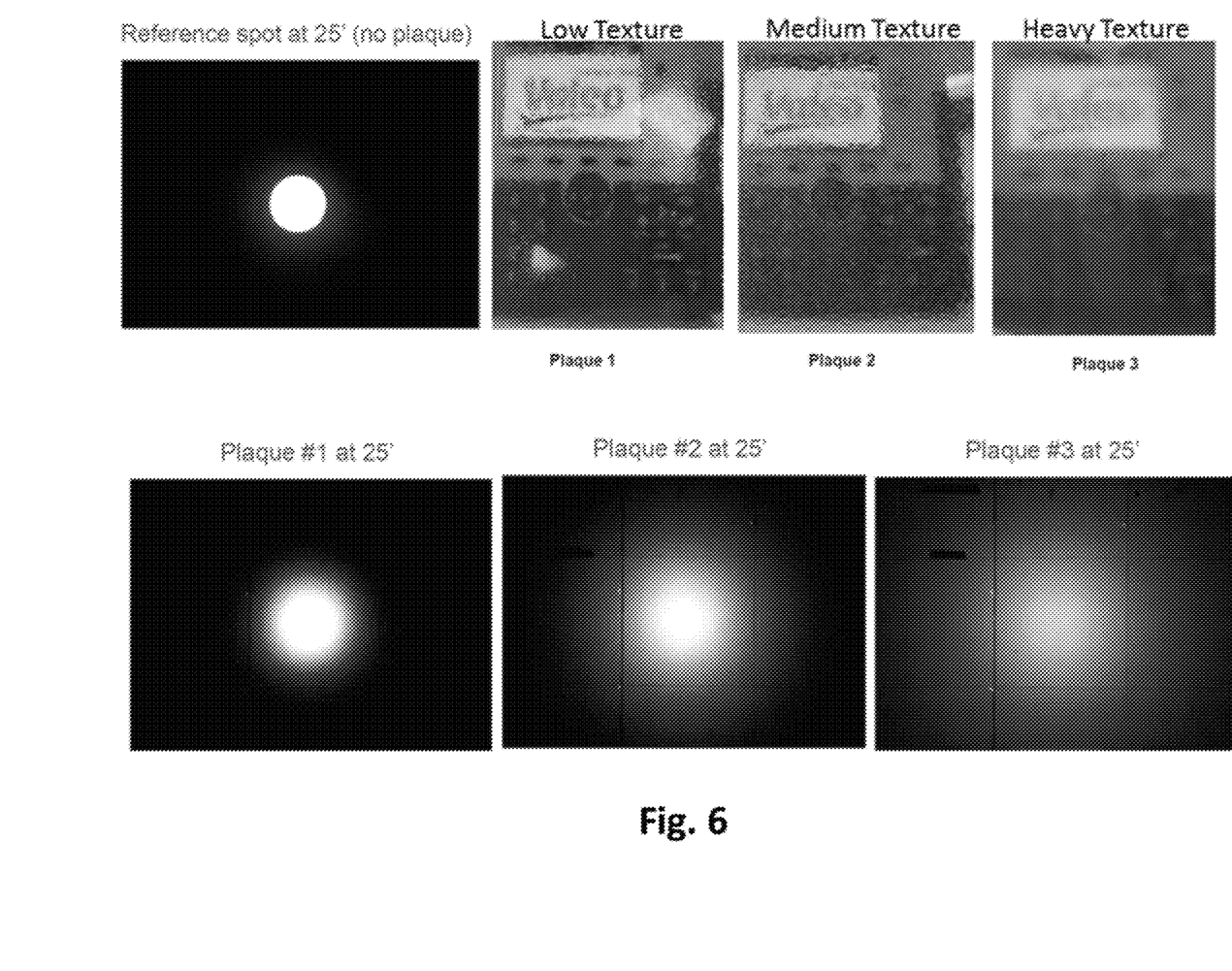
FIG. 6 illustrates photographs of plaques prepared by using different amounts of curing layer according to an embodiment.

FIG. 6 illustrates photographs of plaques prepared by using different amounts of curing layer 220 to process a wrinkled coating on a substrate 210. FIG. 6 illustrates light emanating through the substrates 210 and how the diffusivity is directly proportional to the amount of curing layer 220 applied to the substrates 210.

Varying the wrinkle parameters will affect certain optical properties of the dispersed light penetrating through the one or more lenses. Optical properties that can be observed and measured include, but are not limited to the diffusivity and certain light effects, such as the glow, haze, or intensity. Tall and dense wrinkles provide a high level of diffusivity, while short and sparse wrinkles provide a low level of diffusivity. Likewise, tall and dense wrinkles provide a less intense dispersed light, while short and sparse wrinkles provide a more intense dispersed light. The appearance of a clear substrate can be changed to a different color with the addition of nanoparticles, such as red, blue, etc.

Table 2 illustrates a relationship of wrinkle parameters and optical properties.

TABLE 2

| Wrinkle parameters and optical properties for Acrylate cross-linkers | |
|---|---|
| Wrinkle Parameters | Optical Properties/Effects |
| Dense and tall wrinkles | High diffusivity of dispersed light and homogenous glow |
| Med density and height wrinkles | Some diffusion, glow |
| Low density and height wrinkles | Low diffusivity, high intensity |

In an embodiment, a curing gradient can be regulated across the curing layer 220, wherein different curing parameters are applied to different areas of the curing layer 220 across the substrate 210. As a result, different wrinkle densities and/or different wrinkle heights can be obtained across the substrate 210. This could be used to obtain different diffusive patterns across the substrate 210.

Figure 7:
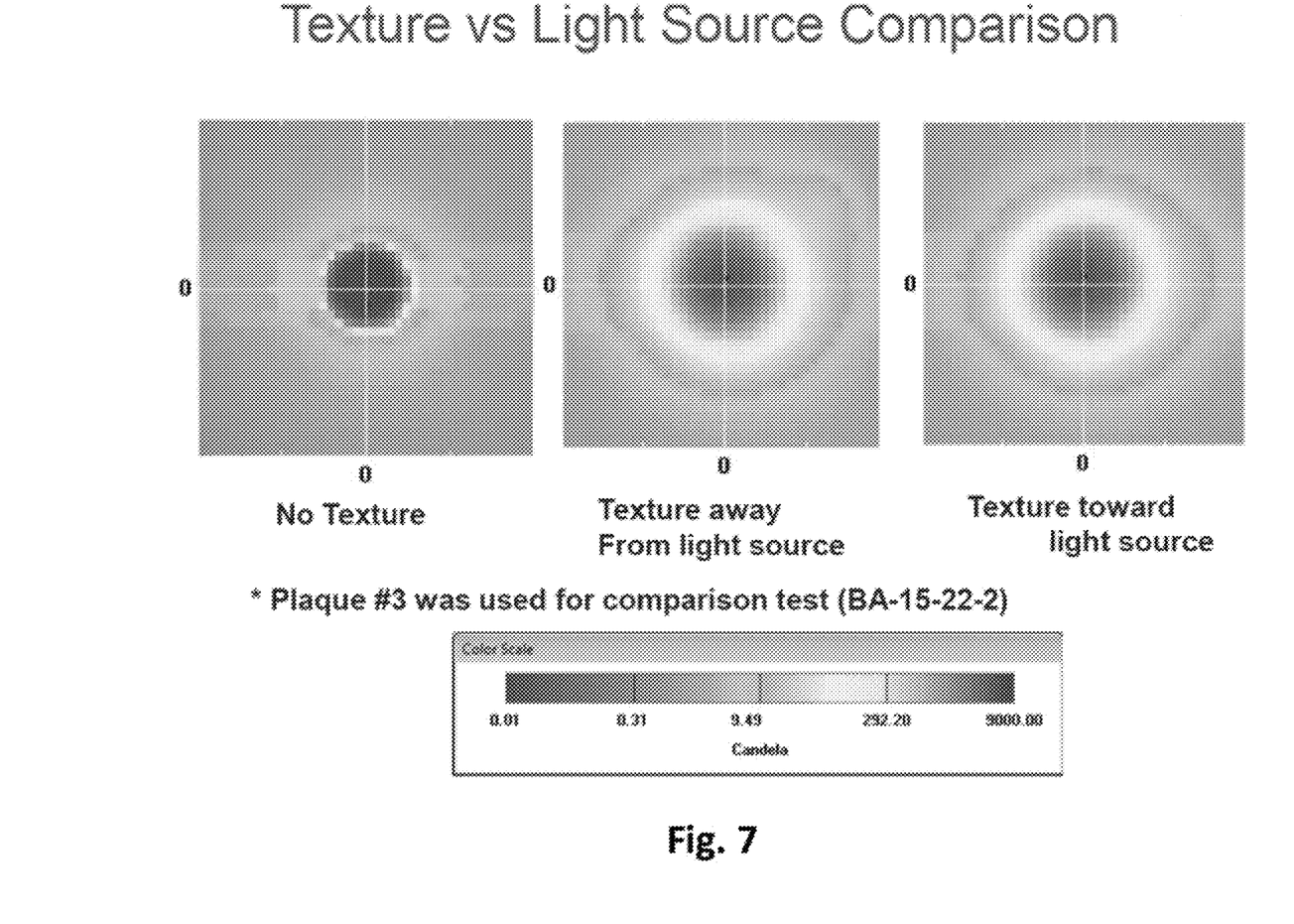
FIG. 7 illustrates examples of a plaque with a variation of distance from a light source according to an embodiment.

FIG. 7 illustrates examples of a plaque with a variation of distance from a light source. In the left view, no wrinkled coating texture was applied. In the middle view, the wrinkled coating texture is facing away from the light source. In the right view, the wrinkled coating texture is facing towards the light source. FIG. 7 illustrates the changes in light output based upon the position of the wrinkled coating texture with respect to the light source.

In another embodiment, masking the curing layer 220 can be used to form various patterns on the resulting wrinkled coating 240. Exposed areas in the mask allow a complete exposure, which results in a fully wrinkled coating 240 in the exposed areas. The areas covered by the mask are only partially exposed, thereby forming a less dense wrinkled coating 240 and/or wrinkles that are shorter in height. An example of using a patterned mask is a lens having an exposed perimeter around the lens to highlight the edges of the lens. An exposure gradient can also be formed in the mask to produce a wrinkle gradient across the substrate 210.

Variations in the initiator can be implemented to distort the coating of the curing layer 220. Different initiators have different curing rates, which will affect the wrinkles formed on exposure to the radiation. Different curing methods can also be used to modify the diffusive texture of the wrinkled coating 240. A UV-cured coating is more useful to develop dense and tall wrinkles to get a more prominent diffusive effect. Thermal curing is used to develop a more subtle diffusive effect with lower density and shorter wrinkles.

The curing process can also be varied according to the particular automotive lamp. For example, a headlight lamp might have curing parameters of time, temperature, power, and wavelength of light to produce wrinkle parameters of a particular density and height of surface wrinkles, which results in optical properties having a range of dispersed light diffusivity. For example, curing parameters of a shorter time and higher power level produce a dense and elevated wrinkled layer, which results in a high diffusivity of dispersed light. Likewise, a taillight lamp might have curing parameters of time, temperature, power, and wavelength of light to produce wrinkle parameters of a particular density and height of surface wrinkles, which results in optical properties having a range of dispersed light diffusivity. In an embodiment, the curing parameters and the wrinkle parameters can be varied according to the function and aesthetic requirement for the particular automotive lamp, such as a clear headlamp or tail lamp, red tail lamp, an amber signal light, and a yellow fog light.

Figure 3A:
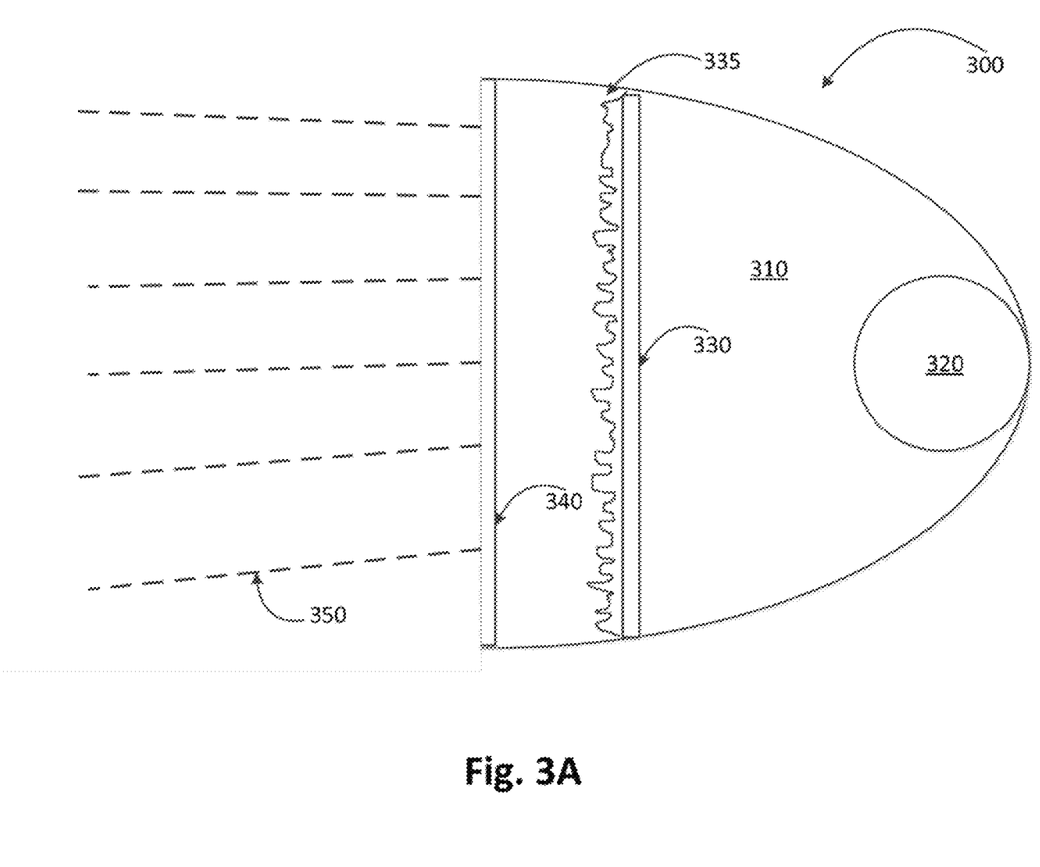
FIG. 3A illustrates a first automotive lamp according to an embodiment.

FIG. 3A illustrates a first automotive lamp 300 according to an embodiment described herein. A parabolic reflector 310 reflects light rays emanating from a light source 320. Light source 320 includes, but is not limited to tungsten, tungsten-halogen, halogen infrared reflective (HIR), high-intensity discharge (HID), and a solid state light source.

A tungsten filament gives off a small amount of light relative to the power it consumes. In addition, tungsten boils off the surface of the filament and condenses on the bulb glass as blackened dust. For these reasons, a tungsten light source is becoming obsolete in the automotive headlamp service.

A tungsten-halogen light source outputs more lumens per watt input. A tungsten-halogen light source provides a longer brightness lifetime compared to a tungsten filament light source.

A halogen HIR light source has a dichroic coating that passes visible light and reflects IR radiation. The reflected IR radiation strikes the filament located at the center of the reflector, which heats the filament to a greater degree than through resistive heating alone. More light is emitted without an increase in power consumption.

A HID light source produces light with an electric arc rather than a glowing filament. The high intensity of the arc comes from metallic salts that are vaporized within the arc chamber. HID lamps can produce a given beam pattern using a smaller headlamp than halogen headlamps.

A solid state light source, such as a headlamp using light-emitting diodes (LEDs) has been applied in many applications. For example, a digitally-controlled LED high beam dims light that shines directly onto oncoming and preceding vehicles, but continues to cast its full light on the zones between and beside those areas. This is accomplished by splitting the LED high beams into numerous individual LEDs. The LEDs are arranged in a matrix and adapt electronically to their surroundings. The LEDs are activated and deactivated or dimmed individually by a control unit. Other solid state light sources are contemplated by embodiments described herein.

The collimated light rays reflected off from the interior surface of the parabolic reflector 310 emanate through an inner lens 330 and an outer lens 340. Direct light rays from the light source 320 also emanate through the inner lens 330 and the outer lens 340. Dispersed light 350 results outside of the first automotive lamp 300 from the emanated light rays. In an embodiment, one or more intermediate lenses are located between the inner lens 330 and the outer lens 340.

Inner lens 330 also illustrates a wrinkled coating 335 on the surface away from the light source 320. In an embodiment, the wrinkled coating 335 can be formed on the surface facing the light source 320. The wrinkled coating 335 is processed and has properties as described herein with reference to FIGS. 2A and 2B.

In FIG. 3A, the inner lens 330 is configured to scatter and diffuse direct and collimated light rays. The outer lens 340 can be configured to further scatter and diffuse the emanating light rays, but also is configured to enclose and protect the lamp components. Examples in which a wrinkled coating 335 is formed on the inner lens 330 include tail lamps with a homogenous glowing look or lamps which have a very strong light source which is used to soften the light. In addition, a wrinkled coating 335 can be formed on one or more of the intermediate lenses. If a lamp requires excessive diffusion, a wrinkled coating 335 can be applied on both sides of the inner lens, or multiple lenses can be used to enhance the diffusive effect. A particular process will be dictated by industrial cost factors, as well.

Figure 3B:
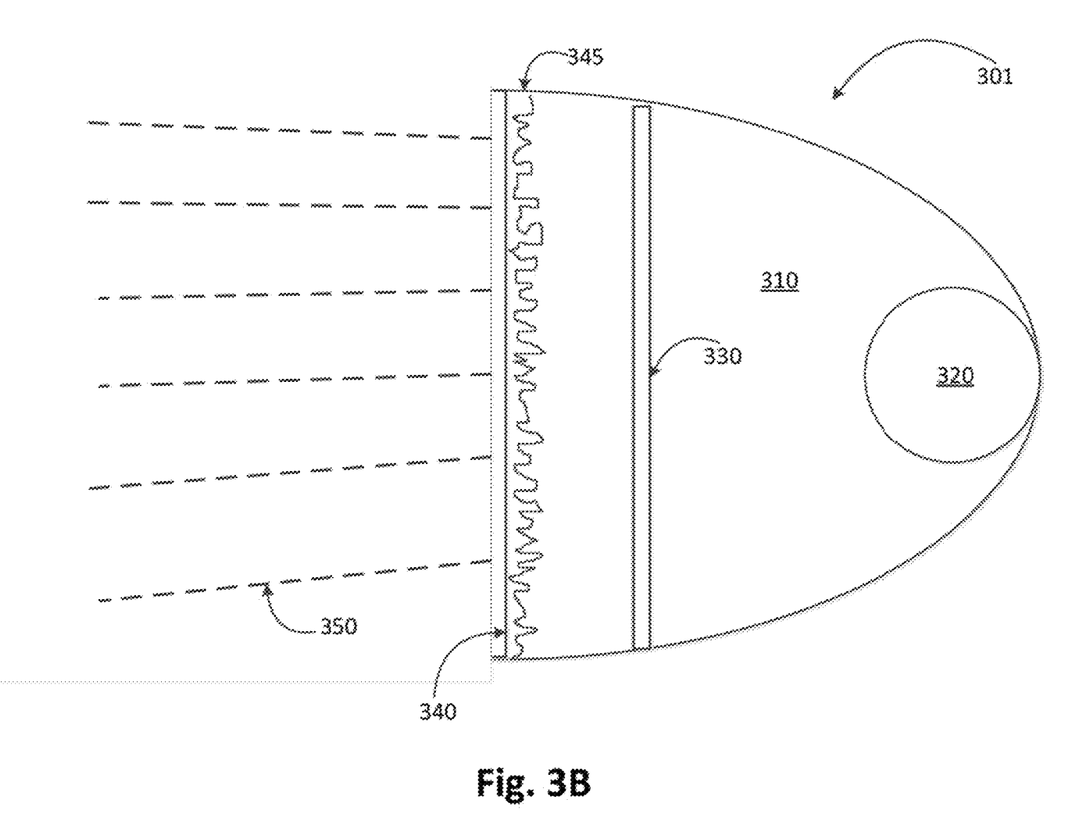
FIG. 3B illustrates a second automotive lamp according to an embodiment.

FIG. 3B illustrates a second automotive lamp 301 having components similar to the first automotive lamp 300. However, FIG. 3B illustrates a wrinkled coating 345 on the exterior surface of the outer lens 340 and no wrinkled coating on the inner lens 330. In an embodiment, the wrinkled coating 345 can be formed on both surfaces of the outer lens 340. In another embodiment, the wrinkled coating 345 can be formed on the inside of the outer lens 340.

The position of the wrinkled coating 345 on the outer lens or the inner lens will be governed in part by the light source used. If the light source is high powered and directly fired, the coating on the inner lens is desirable. If the light source has a reflector, the coating on the outer lens is desirable to achieve the desired glowing effect. The position of the wrinkled coating 345 is also governed by the components of the lamp, especially the source.

Figure 3C:
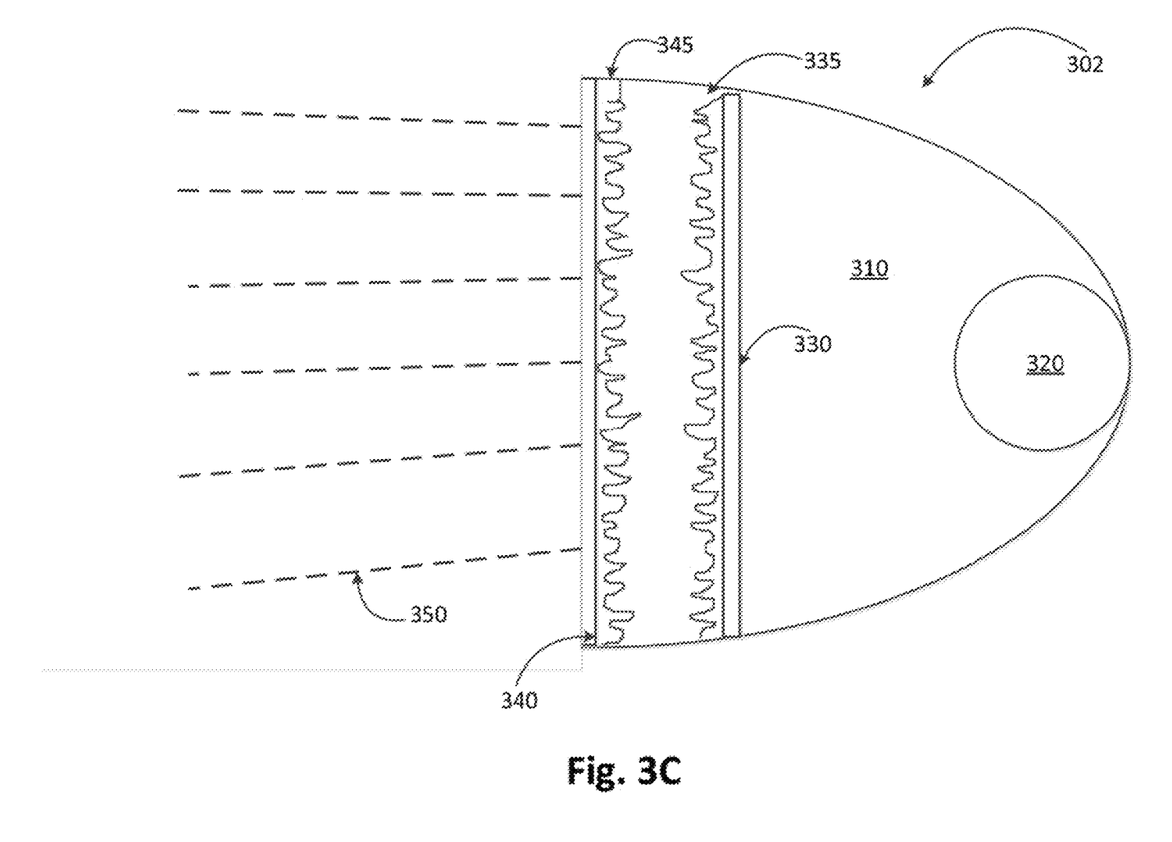
FIG. 3C illustrates a third automotive lamp according to an embodiment.

FIG. 3C illustrates a third automotive lamp 302 having components similar to the first and second automotive lamps 300 and 301, respectively. However, FIG. 3C illustrates a wrinkled coating 335 formed on the inner lens 330 and a wrinkled coating 345 formed on the outer lens 340. Wrinkled coating 335 can be the same as or different from wrinkled coating 345. Examples in which a wrinkled coating is formed on both the inner lens 330 and the outer lens 340 include an automotive lamp in which diffusion of dispersed light rays is maximized. A lamp which needs a clean homogenous look will require multiple lenses to spread the light. The larger the number of lenses, the better homogenous look is achieved. However, the efficiency of the lamp is reduced. In an embodiment, the wrinkled coating 335 can be formed on both surfaces of the inner lens 330, and/or the wrinkled coating 345 can be formed on both surfaces of the outer lens 340.

Figure 4:
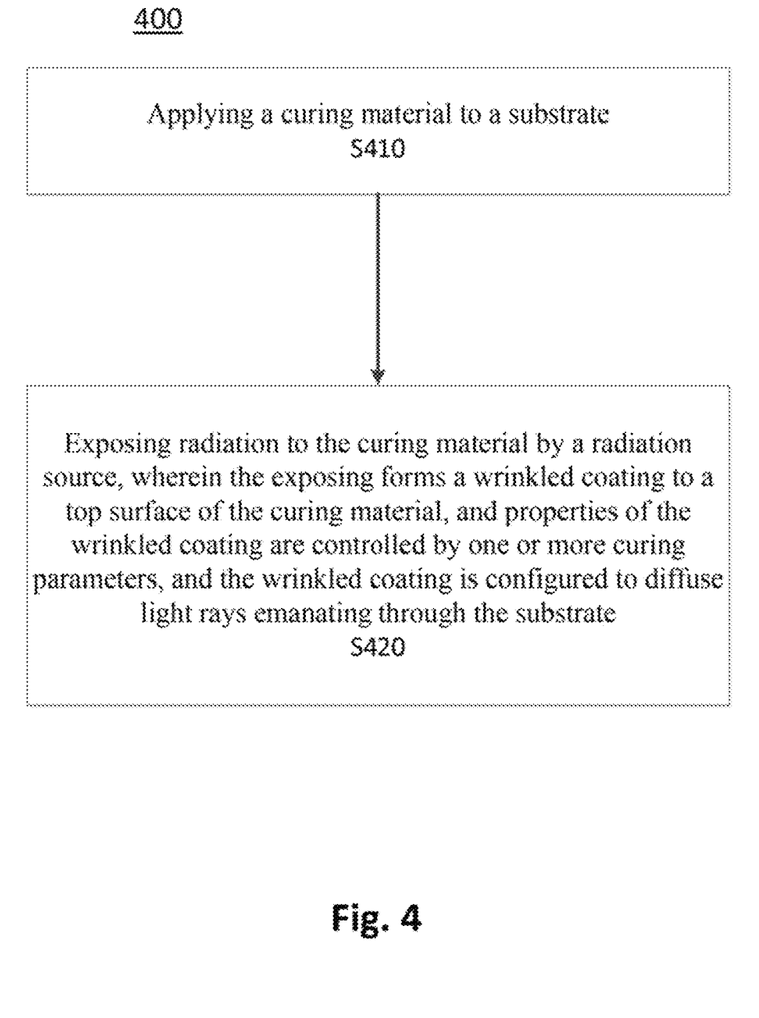
FIG. 4 is a flowchart of an exemplary method of forming a wrinkled coating on a substrate according to an embodiment.

FIG. 4 is a flowchart of an exemplary method 400 of forming a wrinkled coating on a substrate. In an embodiment, the substrate is a lens of an automotive lamp, such as an inner lens, an outer lens, or an intermediate lens.

In step S410, a curing material, such as a varnish or resin and an initiator, is applied to a substrate to form a curing layer. In one embodiment, the initiator and the varnish or resin are applied separately as different components. The separate components allow different components from different suppliers to be used. In another embodiment, the initiator and the varnish or resin are applied together. Applying the materials together minimizes a variation in the coating. An exemplary thickness of the curing layer is 1 micron to 250 microns. The thickness can go still higher, which depends upon the resin or the method used to make the coating.

In step S420, the curing material is exposed to a radiation source. The exposing forms a wrinkled coating to a top surface of the curing material. Properties of the wrinkled coating are controlled by one or more curing parameters. The wrinkled coating is configured to diffuse light rays emanating through the substrate. Table 1 illustrates exemplary combinations of curing time and curing powers that can be used. Table 1 also illustrates the resulting wrinkled layer that forms atop the curing layer as a result of the curing parameters used.

Embodiments herein also describe a substrate coating in which nanoparticles are used. One objective for integrating nanoparticles into the substrate coating is to impart a particular color by dispersed light rays of an automotive lamp. Other objectives for integrating nanoparticles into the substrate coating is to enhance the full spectrum of dispersed light rays and to pattern the dispersed light rays of an automotive lamp.

In one embodiment, the nanoparticles can be mixed into a solution, such as a solution of nanoparticles and a solvent used to suspend the nanoparticles. The solvent should be one that does not attack the resin, such as acetone, isopropyl alcohol, etc., which will depend on the desired effect and the necessary thickness. One example is approximately 0.08 gm/ml, which is applied to the surface of the wrinkled coating after it is cured. There is usually no treatment required after curing.

An objective of nanoparticle application is to impart a particular color to the dispersed light rays of a lens. In a conventional process, a color die is introduced in the molding process of a first lens. A second lens is molded to provide texture to the surface of the second lens. However, embodiments described herein provide color and texture to a lens in a single process application.

For example, gold nanoparticles impart a red color to the dispersed light rays emanating from a lens. Silver core-shell nanoparticles, which are particles made up of a silicon core engulfed in a silver shell, can also impart a red color when the silicon core (34-40 nm) is larger than the silver shell (11-18 nm). A smaller-sized silicon core of 1.3-4 nm with a silver shell of 30.8-35 nm imparts a blue color. Other nanoparticles can be used to impart a particular color. Nano gold particles impart a red color, and medium-sized silicon core silver nanoparticles impart a green color.

Nanoparticles can also be used to produce color effects across a lens. For example, a tail lamp can be multi-functional with a clear lens, wherein nanoparticles can have a large silicon core and silver shell to produce a clear unlit appearance and a red lit appearance. The density of the particles can also produce a fading appearance of the lamp. The smaller core can lead to a blue lit appearance, which can be used to create non-functional lighting. The patterned nanoparticles can be formed via a mask.

Masked nanoparticles can also be used to form decorative patterns. In one example, nanoparticles can be formed on the four corners of a rectangular lamp. When the lamp is activated, the four corner portions give an appearance of a four point source. In a second example, nanoparticles can be formed in a striped horizontal pattern across the lamp. In a third example, nanoparticles can be formed around a perimeter of the lamp to create a faded appearance when the lamp is activated. Other patterns and their associated purposes include coating one side of a two-function lens to give a different appearance to different functions.

Figure 5:
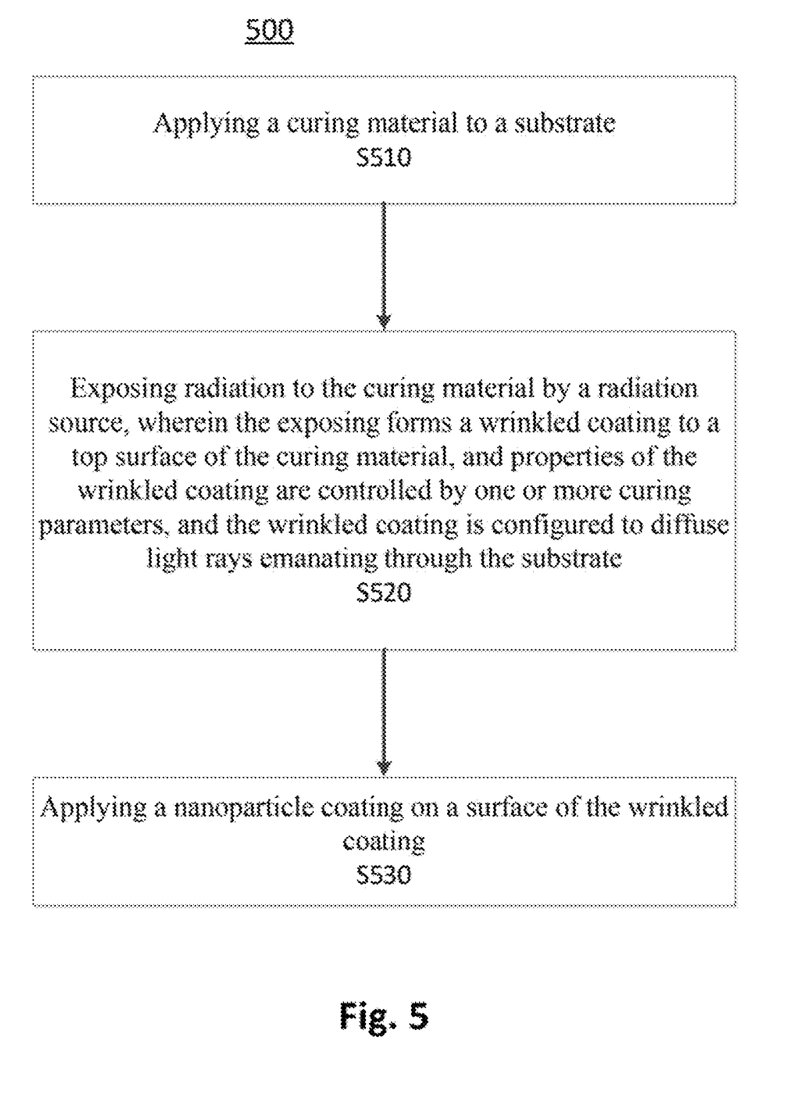
FIG. 5 is a flowchart of an exemplary method of forming a wrinkled coating and a nanoparticle coating according to an embodiment.

FIG. 5 is a flowchart of an exemplary method 500 of forming a wrinkled coating and a nanoparticle coating. In step S510, a curing material, such as a varnish or resin and an initiator, is applied to a substrate to form a curing layer.

In step S520, the curing material is exposed to a radiation source. The exposing forms a wrinkled coating to a top surface of the curing material. Properties of the wrinkled coating are controlled by one or more curing parameters. The wrinkled coating is configured to diffuse light rays emanating through the substrate.

In step S530, a nanoparticle coating is applied on a surface of the wrinkled coating. One example of a nanoparticle coating application is masking a nanoparticle pattern on the surface of the wrinkled coating. A second example of a nanoparticle coating application is applying different nanoparticle compositions to different areas on the surface of the wrinkled coating.

Embodiments described herein provide a diffusive effect to the lens of an automotive lamp through a cured resin or varnish layer, which is irradiated to form a wrinkled layer on the surface. Diffusive properties are enhanced and controlled by the density and height of the wrinkled layer. The wrinkled layer having diffusive properties is achieved in a single part process. Various arrangements can be achieved for an automotive lamp assembly to meet automotive standards, such as AMECA. In addition, the application of nanoparticles to the wrinkled layer provides a designated color to the lens. The nanoparticles can also be patterned for special effects.

Embodiments described herein include the following aspects.

(1) A substrate wrinkled coating includes a substrate, and a curing layer on top of the substrate. The curing layer includes a partially cured portion directly atop the substrate, and a completely cured portion having light-diffusive wrinkles on top of the partially cured portion. Properties of the light-diffusive wrinkles are controlled by one or more curing parameters, and a composition of the partially cured portion is the same as a composition of the completely cured portion.

(2) The substrate wrinkled coating of (1), wherein the substrate comprises an automotive lamp lens.

(3) The substrate wrinkled coating of either one of (1) or (2), wherein the substrate comprises an inner automotive lamp lens and an outer automotive lamp lens.

(4) The substrate wrinkled coating of any one of (1) through (3), wherein the curing layer is atop one of the inner automotive lamp lens and the outer automotive lamp lens.

(5) The substrate wrinkled coating of any one of (1) through (4), wherein the composition of the partially cured portion and the composition of the completely cured portion comprise one of a resin and a varnish, mixed with a curing initiator.

(6) The substrate wrinkled coating of any one of (1) through (5), wherein the light-diffusive wrinkles comprise a wrinkle density and a wrinkle height configured to diffuse light rays emanating through the substrate.

(7) The substrate wrinkled coating of any one of (1) through (6), further includes a nanoparticle coating on top of the completely cured portion, the nanoparticle coating configured to impart a color to diffused light rays emanating through the substrate.

(8) The substrate wrinkled coating of any one of (1) through (7), wherein the nanoparticle coating comprises one of gold nanoparticles and silver shell nanoparticles.

(9) The substrate wrinkled coating of any one of (1) through (8), wherein the nanoparticle coating is patterned.

(10) A method of forming a wrinkled coating includes applying a curing material to a substrate, and exposing radiation to the curing material by a radiation source, wherein the exposing forms a wrinkled coating to a top surface of the curing material, and properties of the wrinkled coating are controlled by one or more curing parameters, and the wrinkled coating is configured to diffuse light rays emanating through the substrate.

(11) The method of (10), wherein the curing parameters include one or more of curing time, curing temperature, a thickness of the curing layer, a type of curing initiator, a radiation exposure wavelength, and a radiation exposure power.

(12) The method of either one of (10) or (11), wherein wrinkle parameters of a height and a density of the light-diffusive wrinkles are determined in part by the curing parameters.

(13) The method of any one of (10) through (12), wherein the wrinkle parameters of the light-diffusive wrinkles determine one or more optical parameters, the optical parameters including a diffusivity, a glow, a haze, or an intensity of light emanating through the curing layer.

(14) The method of any one of (10) through (13), wherein a predetermined time of exposing is inversely proportional to a predetermined power level.

(15) The method of any one of (10) through (14), wherein the wrinkled coating comprises a higher density of wrinkles at a higher predetermined power level and a lower predetermined time.

(16) The method of any one of (10) through (15), wherein the radiation source comprises one of an ultra-violet (UV) source and a thermal source.

(17) The method of any one of (10) through (16), wherein the curing material comprises one of a resin and a varnish, mixed with an initiator.

(18) The method of any one of (10) through (17), further includes applying a nanoparticle coating on a surface of the wrinkled coating.

(19) The method of any one of (10) through (18), wherein the applying includes one of masking a nanoparticle pattern on the surface of the wrinkled coating, and applying different nanoparticle compositions to different areas on the surface of the wrinkled coating.

(20) The method of any one of (10) through (19), wherein the nanoparticle coating comprises one of gold nanoparticles and silver shell nanoparticles.

While certain embodiments have been described herein, these embodiments are presented by way of example only, and are not intended to limit the scope of the disclosure. Using the teachings in this disclosure, a person having ordinary skill in the art can modify and adapt the disclosure in various ways, making omissions, substitutions, and/or changes in the form of the embodiments described herein, without departing from the spirit of the disclosure. Moreover, in interpreting the disclosure, all terms should be interpreted in the broadest possible manner consistent with the context. The accompanying claims and their equivalents are intended to cover such forms or modifications, as would fall within the scope and spirit of the disclosure.

The invention claimed is:

1. A wrinkled coating on a substrate, comprising:
the substrate; and
a curing layer on top of the substrate, the curing layer including a fully cured portion, a curing initiator and a partially cured portion directly atop the substrate,
the curing layer having light-diffusive wrinkles along the surface of the fully cured portion, wherein properties of the light-diffusive wrinkles are controlled by one or more curing parameters,
wherein a composition of the partially cured portion is the same as a composition of the fully cured portion,
wherein the curing layer including the curing initiator and a resin or a varnish,
wherein the substrate is an inner lens of an automotive lamp or an outer lens of the automotive lamp,
wherein the curing layer is on top of at least one of the inner lens or the outer lens; and
wherein the composition is less than 29% light diffusive after curing through a radiation process.

2. The wrinkled coating of claim 1, wherein the light-diffusive wrinkles comprise a wrinkle density value and a wrinkle height dimension configured to diffuse light rays emanating through the substrate.

3. The wrinkled coating of claim 1, further comprising:
a nanoparticle coating on top of the fully cured portion, the nanoparticle coating configured to impart a color to diffused light rays emanating through the substrate.

4. The substrate wrinkled coating of claim 3, wherein the nanoparticle coating comprises one of gold nanoparticles or silver shell nanoparticles.

5. The substrate wrinkled coating of claim 3, wherein the nanoparticle coating is patterned.

6. A wrinkled coating applied to an automotive lamp comprising:
a curing layer, the curing layer including a partially cured portion, a curing initiator and a fully cured portion with a number of light-diffusive wrinkles on top of the partially cured portion,
wherein properties of the light-diffusive wrinkles are controlled by one or more curing parameters, and a composition of the partially cured portion is the same as a composition of the fully cured portion,
wherein the curing layer including the curing initiator and a resin or a varnish,
wherein the wrinkled coating is applied to an inner lens of the automotive lamp or an outer lens of the automotive lamp,
wherein the curing layer is on top of at least one of the inner lens or the outer lens; and wherein the composition is less than 29% light diffusive after curing through a radiation process.

7. The wrinkled coating of claim 6, wherein the light-diffusive wrinkles comprise a wrinkle density value and a wrinkle height dimension configured to diffuse light rays emanating through the substrate.

8. The wrinkled coating of claim 6, further comprising:
a nanoparticle coating on top of the fully cured portion, the nanoparticle coating configured to impart a particular predetermined color to diffused light rays emanating through the substrate.

9. The wrinkled coating of claim 8, wherein the nanoparticle coating comprises one of gold nanoparticles or silver shell nanoparticles.

10. The wrinkled coating of claim 8, wherein the nanoparticle coating is patterned.

* * * * *